United States Patent
Devine et al.

(10) Patent No.: US 11,454,865 B2
(45) Date of Patent: Sep. 27, 2022

(54) DYNAMIC CAMERA LENS CAP

(71) Applicants: Bradley Hogan Rivas Devine, South Jordan, UT (US); Beau Oyler, Salt Lake City, UT (US)

(72) Inventors: Bradley Hogan Rivas Devine, South Jordan, UT (US); Beau Oyler, Salt Lake City, UT (US)

(*) Notice: Subject to any disclaimer, the term of this patent is extended or adjusted under 35 U.S.C. 154(b) by 0 days.

(21) Appl. No.: 17/565,513

(22) Filed: Dec. 30, 2021

(65) Prior Publication Data
US 2022/0252960 A1 Aug. 11, 2022

Related U.S. Application Data

(60) Provisional application No. 63/132,325, filed on Dec. 30, 2020.

(51) Int. Cl.
*G03B 11/04* (2021.01)
*G03B 11/06* (2021.01)

(52) U.S. Cl.
CPC .......... *G03B 11/041* (2013.01); *G03B 11/045* (2013.01); *G03B 11/06* (2013.01)

(58) Field of Classification Search
CPC ..... G03B 11/041; G03B 11/045; G03B 11/06; G02B 5/005; G02B 23/16

USPC .................................................. 359/511, 739
See application file for complete search history.

(56) References Cited

U.S. PATENT DOCUMENTS

| 4,415,242 | A | 11/1983 | Major |
| 5,438,452 | A * | 8/1995 | Gruber .................... H04N 5/33 359/227 |
| 8,071,947 | B2 | 12/2011 | Garman et al. |
| 10,359,257 | B2 | 7/2019 | Lowell |
| D860,293 | S | 9/2019 | Lowell |

* cited by examiner

*Primary Examiner* — Christopher E Mahoney

(57) ABSTRACT

The present disclosure is directed to a lens cap with an integrated iris that screws onto a camera lens. Once secured on a camera lens, the iris may be opened by rotating an outer edge of the lens cap in a first direction. When in an open position, the entire surface of the camera lens is free from obstruction and photos may be taken as if the lens cap were not even there. The iris can literally disappear within an edge of circular lens cap. By rotating the lens cap in an opposite direction, the lens may be completely covered by the integrated iris again. For example, the iris may be opened by rotating the lens cap in a clockwise direction and then closed again by rotating the lens cap in a counter clockwise direction. Once installed, this lens cap never has to be removed.

11 Claims, 10 Drawing Sheets

DYNAMIC CAMERA LENS CAP

PRIORITY INFORMATION

The present application claims the benefit of U.S. Provisional Patent Application No. 63/132,325, filed Dec. 30, 2020, the contents of which are incorporated herein by reference.

BACKGROUND OF THE INVENTION

Field of Invention

This disclosure introduces a new type of protection for an optical lens. More specifically, the present disclosure is directed to a new form of dynamic camera lens cap having an adjustable iris.

Description of the Related Art

Lenses of various types of equipment, especially camera lenses, are commonly protected by a lens cap. Lens caps commonly slip onto the end of a camera lens and protect the lens from scratches by covering the entire lens. These conventional lens caps must be removed from the end of a lens before that lens can be used to take photographs. Once removed from the lens, these lens caps are easily misplaced or lost. As a result, the lens may be more susceptible to being scratched or damaged.

After a camera is used, the lens cap must be retrieved from wherever it was placed and attached to the lens in order to protect the lens. Even though a lens cap may be attached to a camera with a string or tether, a dangling lens cap may interfere with the operation of a camera or may become tangled with other items or with a strap used to carry the camera around a person's neck or shoulder.

While clear or colored lens covers or filters protects a main camera lens from damage, these covers and filters are themselves susceptible to being scratched. Once scratched, these clear or colored lens covers or filters either have to be replaced or removed for clear images to be pass to the lens.

SUMMARY

For all of the reasons above, what is needed is a new form of lens cap that once installed does not have to be removed from a lens. What is also needed is a lens cap that even if it is scratched that does not distort light entering a lens when the lens cap is in an orientation that allows light to pass onto the surface of the lens.

The present disclosure is directed to a camera lens cap or cover that once attached to a camera lens never needs to be removed from that lens. This lens cap may include a cover portion that includes exterior threads that attach to complementary threads of a camera lens. The lens cap also includes an iris mechanism configured at least part in the cover portion, the iris mechanism also includes a plurality of blades that form an iris. The pre lens cover also includes a control mechanism that a user can interact with to open the iris to use the camera lens or to close the iris to protect the camera lens.

In one embodiment, the lens cap may include the cover portion, the iris mechanism, and the control mechanism discussed above and may also include a first set of coupling mechanisms that are coupled to the cover portion. In this embodiment, the lens cap cover may include a plurality of couplers that attach the blades of the iris mechanism to the cover portion. Each of the couplers may be attached to at least one blade of the iris mechanism, and these couplers may mate with the first set of coupling mechanisms to attach the iris mechanism to the cover portion. The iris mechanism may also include a first set of features of a first camming mechanism that is coupled to the control mechanism. Here the lens cap cover may also include a second set of features of the first camming mechanism that couple the iris mechanism to the control mechanism.

In certain instances, the cover portion of the lens cap cover discussed above may be part of an inner circular portion that includes the first set of coupling mechanisms.

The plurality of couplers discussed and the first set of coupling mechanisms discussed above may mate or attach via a set of pins that fit into a set of holes. Here the first set of features and the second set of features of the camming mechanism discussed above may connect to each other (or couple together) based on a series of pins that fit into a series of slots.

By simply rotating the control mechanism discussed above, the lens cap cover may be opened. This rotation of the control mechanism may force relative motion of each of the blades in the iris mechanism based on the first camming mechanism. As the control mechanism is rotated, an aperture may be open and increase in size until each of the iris blades retract to a critical circular size. Here the iris blades may move until they are entirely covered by a portion of the control mechanism.

The lens cap cover discussed above may also include a second camming mechanism that is attached to an arm. This second camming mechanism may rotate the arm to a center position when the iris mechanism is in a closed position. This arm may cover a small hole that remains in the iris mechanism when the iris mechanism is closed. This arm may press against the iris mechanism when the iris mechanism is closed. When the arm presses against the iris mechanism, it may tend to push the iris mechanism away from the camera lens or it may support the iris mechanism from being easily pushed against the camera lens by an external force.

In certain instances, the lens cap cover may include a spring that includes a slot that engages a pin of the arm mentioned above. Here this pin and the slot may be part of the second camming mechanism discussed above.

In yet another embodiment, the camera lens cap cover may include an arm of a camming mechanism that rotates the arm to a position adjacent to a center portion of the camera lens when the iris mechanism is closed. The lens cap cover camming mechanism may include a first part that rotates the arm and may include a second part in the cover portion. Here the first and the second parts of the camming mechanism may engage each other, the arm may be forced to rotate based on relative motion of the first and second parts of the camming mechanism. This relative motion may be based on the movement of a pin in a slot. This embodiment may also include a spring that includes a slot that engages a pin of the arm, where the arm and the slot of the spring form a portion of the camming mechanism.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

The present disclosure is directed to a lens cap with an integrated iris that screws onto a camera lens. Once secured on a camera lens, the iris may be opened by rotating an outer edge of the lens cap in a first direction. When in an open position, the entire surface of the camera lens is free from obstruction and photos may be taken as if the lens cap were not even there. The iris can literally disappear within an edge of circular lens cap. By rotating the lens cap in an opposite direction, the lens may be completely covered by the integrated iris again. For example, the iris may be opened by rotating the outer edge of the lens cap in a clockwise direction and then closed again by rotating the outer edge of the lens cap in a counter-clockwise direction. When the lens cap is secured using threads on a camera lens, frictional forces that hold the camera lens cap on the lens are greater than an amount of force required to reposition the iris. Because of this, once the lens cap is installed on a camera lens, it may never have to be removed. Camera lenses may also be removed from a camera when the lens cap is installed. For example, a single-lens reflex (SLR) camera lens may be protected from scratches simply by keeping the iris in the closed position. Photographers may also open the iris partially and take photos through the camera lens when the lens is partially covered.

Figure 1:
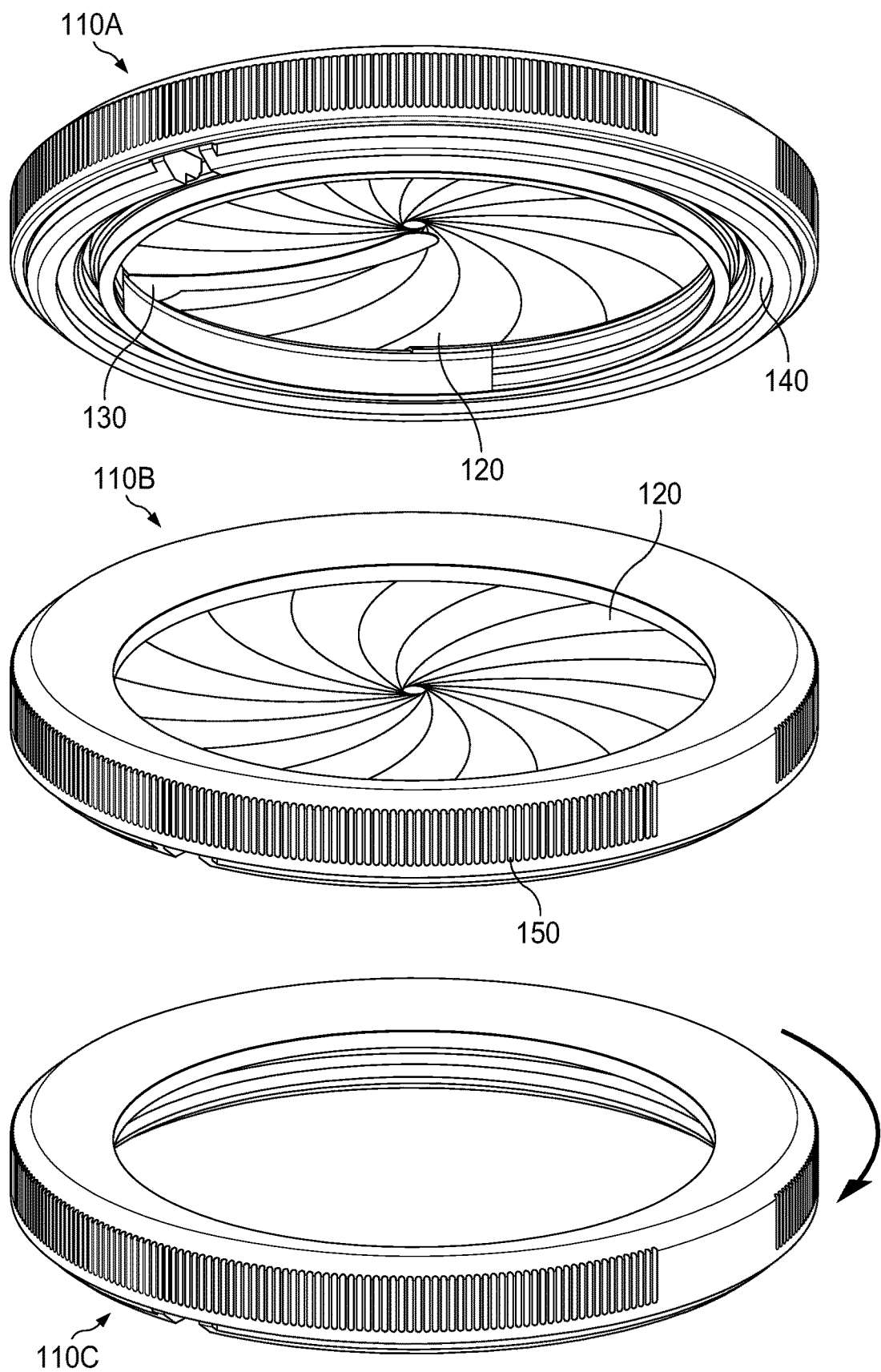
FIG. 1 illustrates a perspective view of the controller of FIG. 1 from a right-back side of the controller.

FIG. 1 illustrates three different perspective views of a camera lens cap 110A consistent with the present disclosure. FIG. 1 includes a bottom perspective view of camera lens cap 110A. An iris 120 may be comprised of a plurality of individual blades. An arm 130 can cover a small circular hole of the iris 110A when the iris is in the fully closed position. Camming mechanisms not illustrated in FIG. 1 are used to actuate arm 130 and to open and close the iris 110A. Arm 130 may only move when the iris is near or at the completely closed position. As such, arm 130 may retract completely when the lens cap 110A is initially rotated to open it and may deploy again when the iris is nearly entirely closed. Threads 140 can be located on an inner portion of the lens cap 110A. Threads 140 may be used to securely attach the lens cap to a camera lens. Threads 140 may be included within what may be referred to as a cover portion of the lens cap 110A. The threads 140 can be used to screw the lens cap onto a threaded receiving ring (not shown) on a camera lens. As noted below, other attachment structures to attach the lens cap to the camera lens can also be used.

FIG. 1 also includes a top perspective view of camera lens cap 110B that shows iris 120 in the closed position. A knurled edge 150 can allow the fingers of a person to easily grab and rotate the lens cap 110B when the iris is opened or closed. Item 110C illustrates the lens cap in the fully open position. Note that in FIG. 1, when the iris 120 is completely open, iris 120 and arm 130 are complexly contained within an outer portion of the lens cap 110C.

Lens cap covers of the present disclosure may be made to fit specific types and sizes of camera lenses and may be made to attach to specific threads of those camera lenses. These lens cap covers may fit on camera lenses in a manner similar to how camera lens filters are attached to a camera lens. As such, lens cap covers may be of a size compatible to fit specific standard camera lens. For example, lens cap covers may have threads that fit standard camera thread diameters of 24 millimeters (mm), 49 mm, 52 mm, 55 mm, 58 mm, 62 mm, 67 mm, 72 mm, 77 mm, 82 mm, 86 mm, 95 mm, and 105 mm. Any thread diameter between 24 mm and 105 mm, inclusive, can be used. Other diameters larger or smaller than this range are also contemplated. The threads included in these lens cap covers may have a thread pitch that is compatible threads included on standard camera lenses. For example, a lens cap cover may have threads that have a 0.75 mm pitch when a specific camera lens has threads with a pitch of 0.75 mm. In other instances, thread pitches may be of other sizes, for example a pitch of between 0.5 mm and 1 mm, inclusive, may be used to fit a lens cap cover onto an Olympus OM Zuiko 350 mm F/2.8 lens. Any thread diameter or thread pitch that is used for camera lenses can be applied to the present disclosure.

Figure 2:
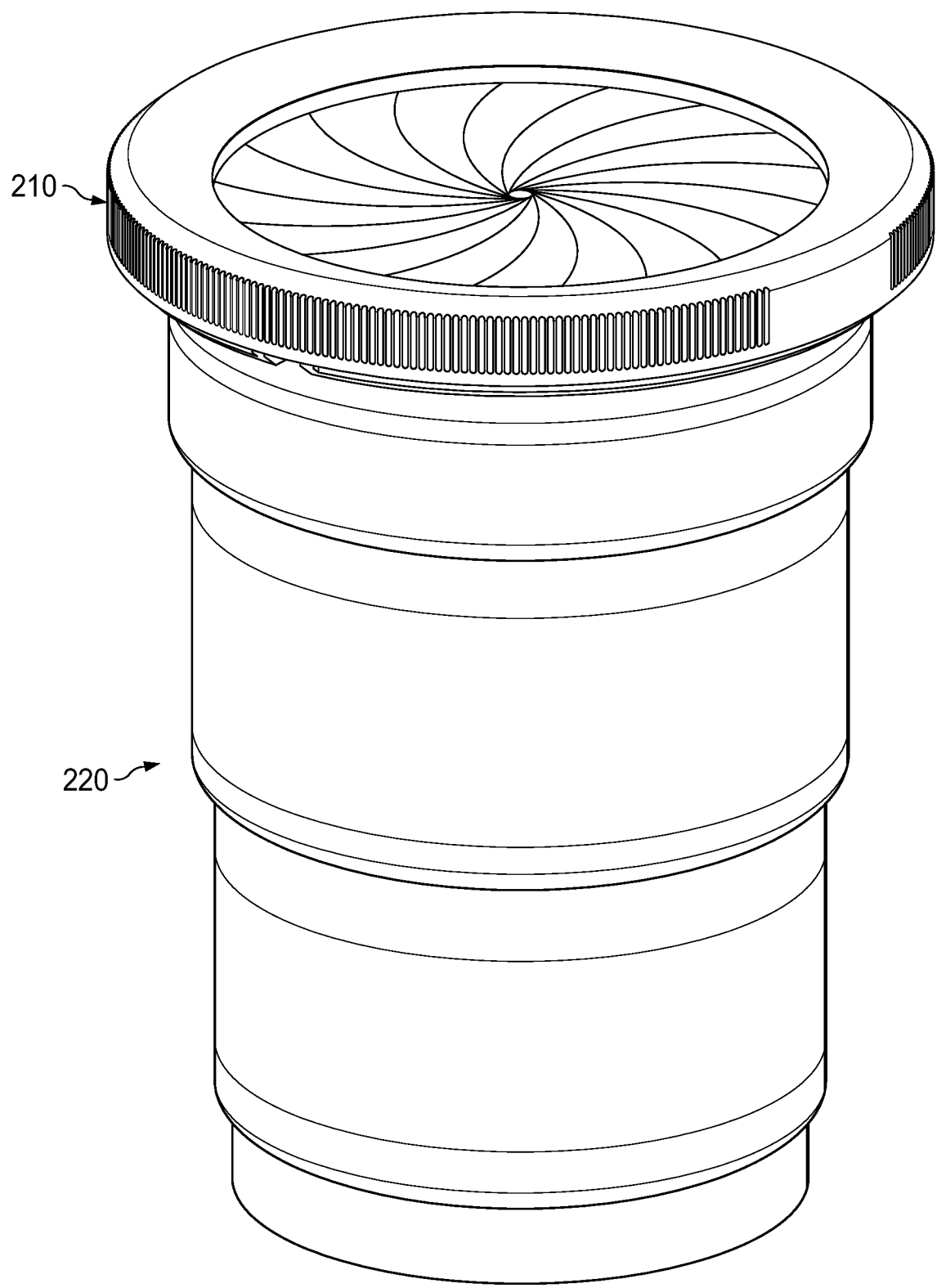
FIG. 2 illustrates the lens cap of FIG. 1 when it is installed on a camera lens.

FIG. 2 illustrates the lens cap of FIG. 1 when it is installed on a camera lens. FIG. 2 includes lens cap 210 installed on camera lens 220. Note that the iris 120 and arm 130 (not shown given its position to the iris 120) in the closed position completely cover a camera lens that is located directly below the lens cap 210.

Figure 3:
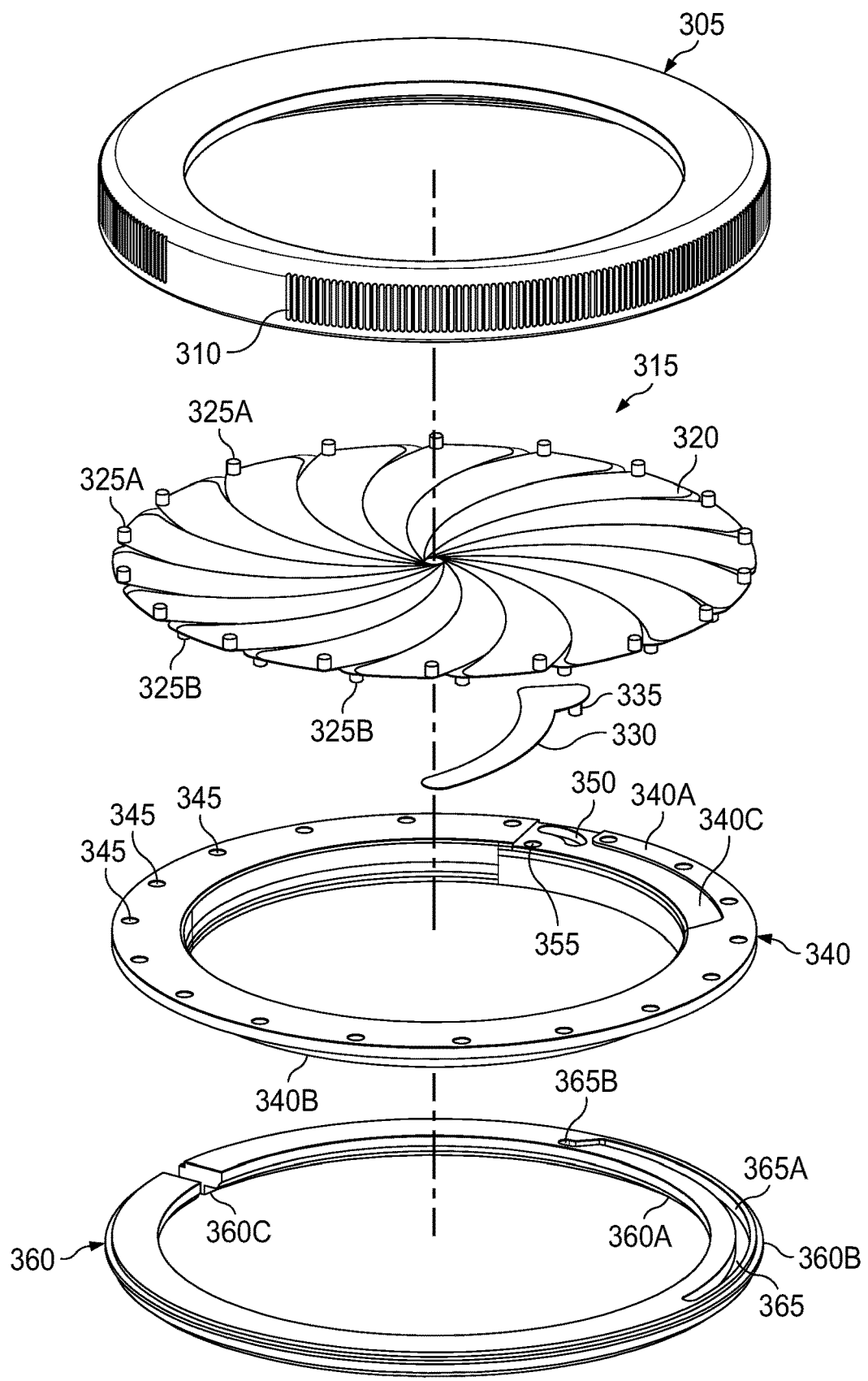
FIG. 3 illustrates a set of parts that may be included in lens cap of the present invention.

FIG. 3 illustrates a set of parts that may be included in lens cap of the present disclosure. FIG. 3 includes an outer ring 305, iris 315, arm 330, inner ring 340, and retention spring 360. Outer ring 305 includes knurled edge 310 that is similar to the knurled edge 150 of FIG. 1. Iris 315 includes a plurality of blades 320 and blades 320 include numerous pins 325A/325B. Each of the blades 320 of FIG. 3 can include two different pins, one on a top portion of each blade 320 and one on a bottom portion of each blade 320. The pins 325A/325B of FIG. 3 may engage or mate with other features of a camera lens cap of the present disclosure. FIG. 3 also includes arm 330 that may also include features, such as pins 335 that engage with specific features of a camera lens cap. While FIG. 3 only shows a single pin 335 on arm 330, FIG. 4B illustrates that the arm 330 may include more than one pin.

Inner ring 340 can include a first set of holes 345, a hole 355, and a slot 350. Each of the holes 345 of inner ring 340 may receive pins 315B located on the bottom surface of iris 315. These bottom pins engage or mate with holes 345 of inner ring 340. Different pins 335 included in the arm 330 may engage or fit in respectively hole 355 and in slot 350 of inner ring 340. Inner ring 340 may include a top portion 340A and a bottom portion 340B and each of these portions may have a different diameter.

FIG. 3 also includes a spring 360 that may snap onto the bottom portion 340B of inner ring 340. Spring 360 includes a slot 365 that has a shape of an arc 365A that is perpendicular to inner surface 360A and outer surface 360B of spring 360. Spring 360 also include a dog-leg shaped portion 365B that may be positioned directly under slot 350 of the inner ring 340. The spring 360 also can include a gap 360C that allows spring 360 to be expanded when snap-fit onto the bottom portion 340B of inner ring 340.

Spring 360 and inner ring 340 may be configured to rotate relative to each other as outer ring 305 is rotated. This may allow a first pin 335 of arm 330 to travel along slot 365 of spring 360. This first pin 335 of arm 330 may also fit through slot 350 of inner ring 340. A second pin (not visible in FIG. 3) may fit into hole 355 and this second pin may attach arm 330 to inner ring 340. When the outer ring 305 is rotated, the first ping 335 of arm 330 may travel along slot 365 traversing both portion 365A and portion 365B of slot 360. Since the dog-legged portion 365B of slot 360 moves toward inner surface 360A and away from outer surface 365B of spring 360 and since hole 355 retains the second pin of arm 330, when the first pin 335 of arm 330 moves through the dog-legged portion 365B of slot 365, arm 330 will be forced to rotate along slot 350 of inner ring 340. The pins 335 of arm 330, hole 355 and slot 350 of inner ring 340, and slot 365 of spring 360 form a camming mechanism that forces arm 330 to rotate to or from a position where arm 330 covers a small hole in the center of iris 315 when iris 315 is closed and that forces arm 330 to rotate to a position over a recessed portion 340C of inner ring 340. As such, the recessed portion 340C of inner ring 340 allows arm 330 to swing to a position where it no longer covers any portion of a camera lens.

While FIG. 3 illustrates various pins and holes of specific surfaces of specific parts of a lens cap consistent with the present disclosure, the disclosure is not limited to these specific pin and hole configurations. As such, features that are illustrated as pins may alternatively be implemented as holes and features that are illustrated as holes may be implemented as pins. Outer ring 305 may also be referred to as a control mechanism that a user can interact with by simply rotating outer ring 305 to open or close iris 315. Furthermore, inner ring 340 may be referred to as a cover portion that includes threads used to attach the lens cap to a camera lens. This cover portion may also include spring 360 or spring 360 and inner ring may be fabricated as a single piece. In certain instances, spring 360 may include threads used to attach the lens cap to the camera lens.

Figure 4A:
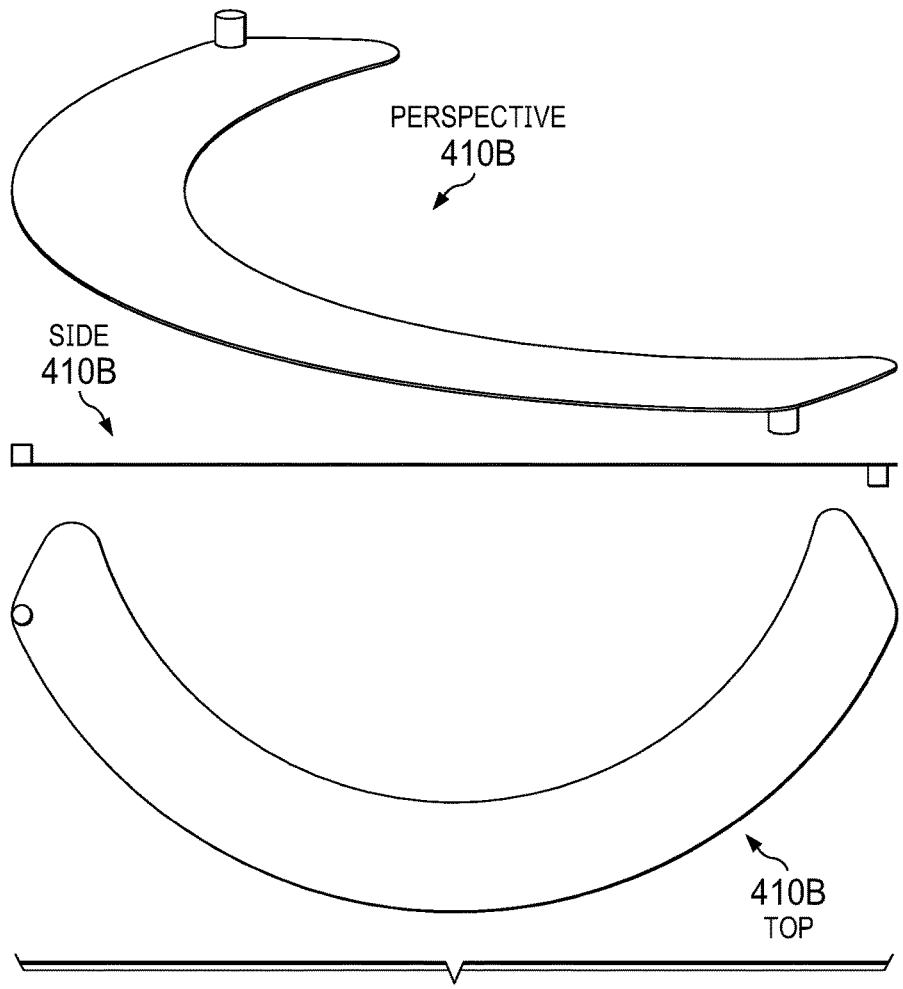
FIG. 4A illustrates a possible shape of an iris blade.
Figure 4B:
FIG. 4B illustrates a possible shape of an arm that may be used to cover a center portion of an iris.

FIG. 4A illustrates a possible shape of a respective iris blade 410B. FIG. 4A illustrates a perspective view of iris blade 410B, a side view of iris blade 410B, and a top view of iris blade 410B. Note that iris blade 410B includes pins that protrude from a top and a bottom surface of iris blade 410B. A plurality of blades like iris blade 410B may be used to make any of the iris's included in FIGS. 1-3 discussed above. While FIG. 4A illustrates pins on opposite ends of iris blade 410B, these pins may be placed in other locations that allow an iris to operate. As such, the pin locations of FIG. 4A are exemplary.

FIG. 4B illustrates a possible shape of an arm that may be used to cover a center portion of an iris. Arm 420 of FIG. 4B may be arm 130 of FIG. 1 or be arm 330 of FIG. 3. Arm 420 of FIG. 4B includes pin 430 that is longer than pin 440. Because of this length difference, smaller pin 440 may fit into hole 355 of FIG. 3. Pin 430 may extend through slot 350 of inner ring 340 and into slot 365 of spring 360 of FIG. 3.

As discussed above, relative motion between spring 360 and inner ring 340 would cause arm 420 to rotate around pin 440 as pin 430 moves through the dog-legged portion 365B of inner portion 340 of FIG. 3. This is because arm 420, pin 440, and pin 430 are a rigid structure that would prevent pins 430 and 440 from moving toward or away from each other. This is also because pin 440 is located at a static location in inner portion 340 of FIG. 3, where pin 430 is not. As pin 430 moves from a position closer to the inner surface 360A of FIG. 3 to a position farther from that inner surface along slot 365 or visa versa, arm 420 would be forced to rotate based on the structural elements of FIGS. 1 and 4.

Figure 5:
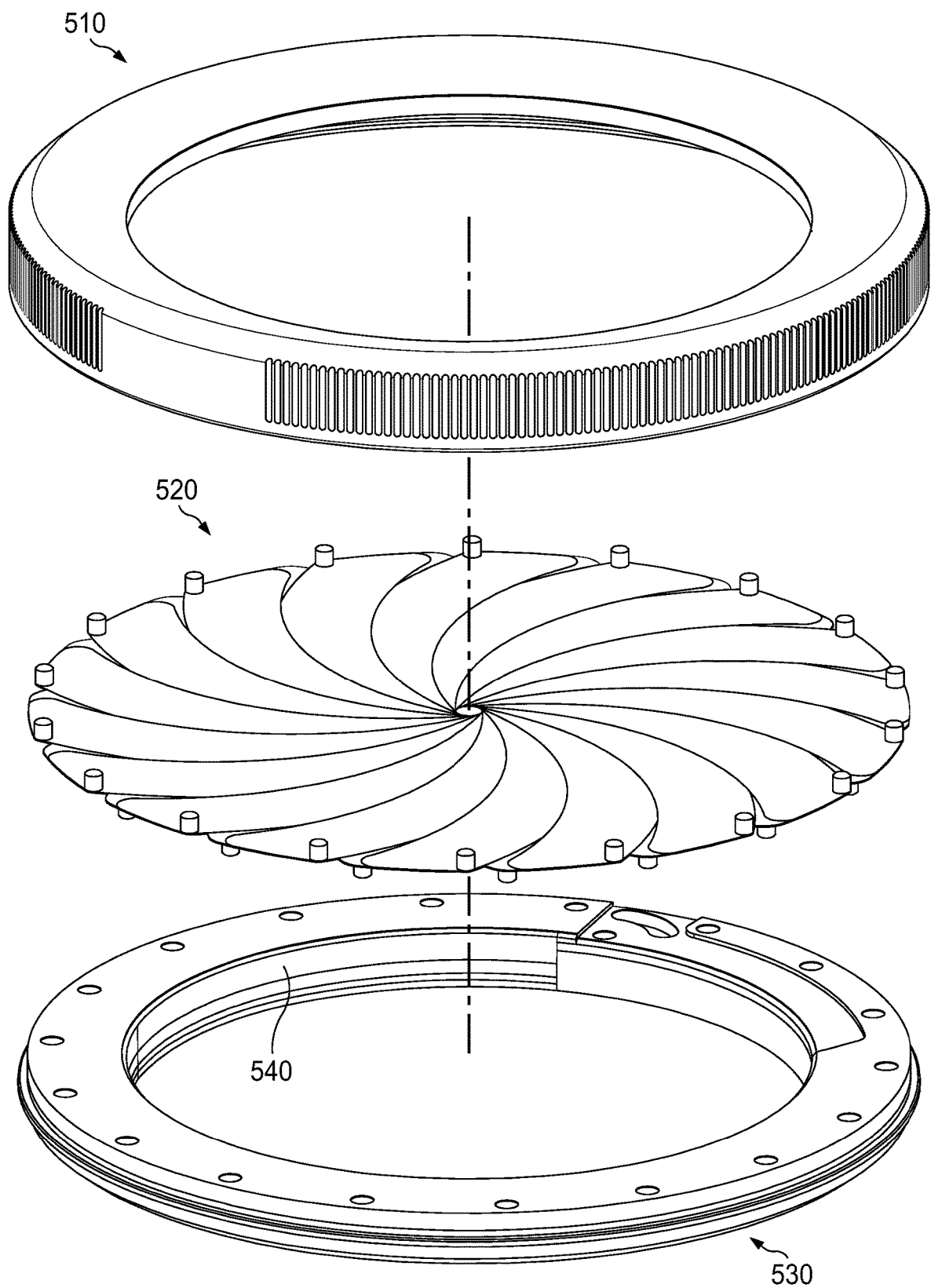
FIG. 5 illustrates a second perspective view of various parts of a lens cap of the present disclosure.

FIG. 5 illustrates a second perspective view of various parts of a lens cap of the present disclosure. FIG. 5 includes outer ring 510, iris 520, and inner ring 530. Note that inner portion 540 of the inner ring 530 FIG. 5 includes threads that may be used to attach the lens cap to a camera lens 220. The perspective images of FIG. 5 are illustrated from a position slightly above the outer ring 510, iris 520, and inner ring 530.

Figure 6:
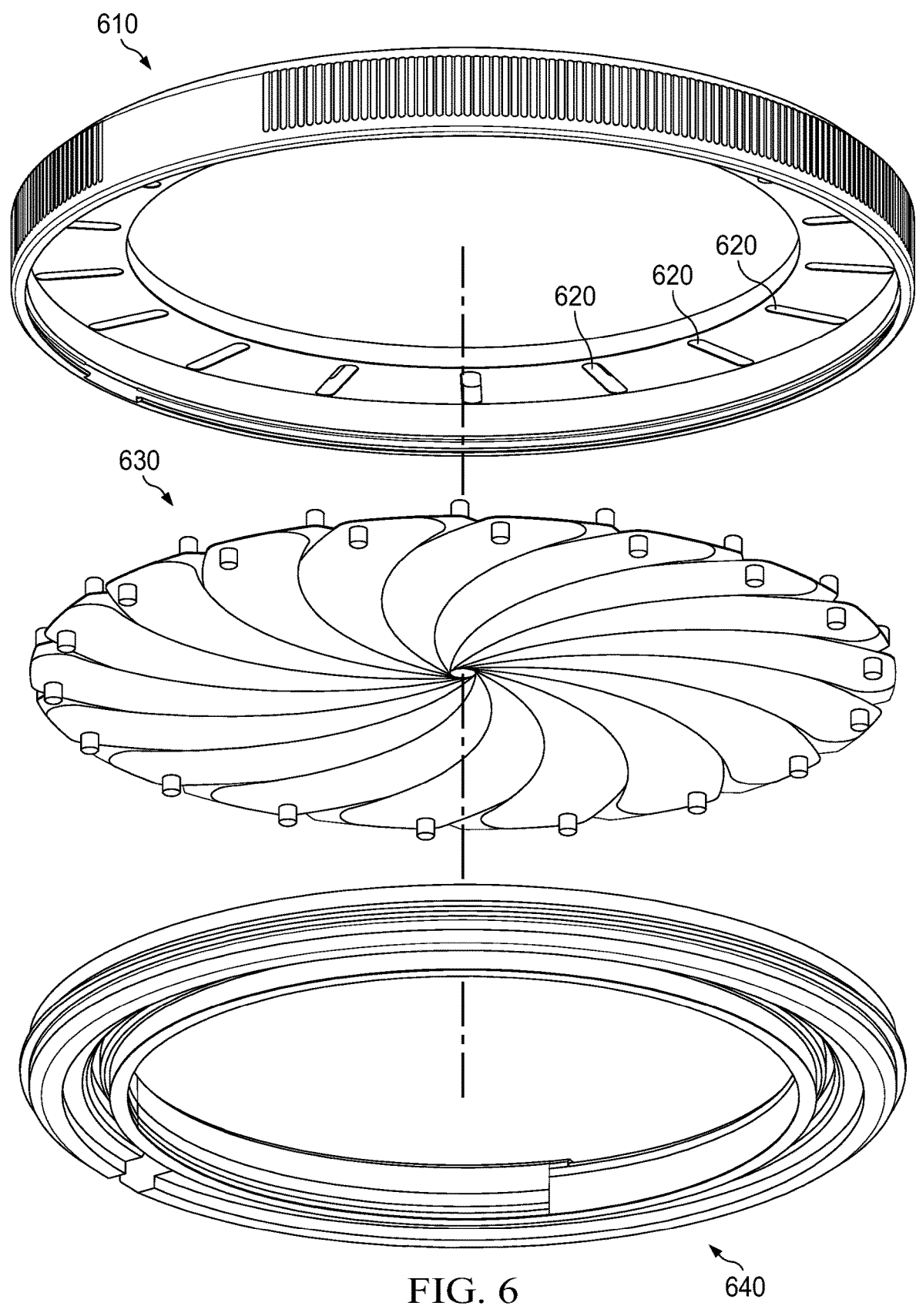
FIG. 6 illustrates a third perspective view of various parts of a lens cap of the present disclosure.

FIG. 6 illustrates a third perspective view of various parts of a lens cap of the present disclosure. Like FIG. 5, FIG. 6 illustrates three parts. In FIG. 6, however, the parts of the lens cap are viewed from a perspective slightly below the lens cap parts. FIG. 6 includes outer ring 610, iris 630, and inner ring 640. FIG. 6 also illustrates slots 620 included in outer ring 610. Slots 620 may extend through only a portion of outer ring 610. For example, slots 620 may only extend half-way through outer ring 610. The upper pins 325A of the iris 315 of FIG. 3 may, thus, engage these slots and rotation of the outer ring control mechanism 610 may cause pins 325A to move along these slots, forcing iris blades 320 of FIG. 3 to move to an open position. At this time, bottom pins 325B of iris 320 may hold an outer edge of iris blades 320 in a fixed location relative to holes 345 of inner portion 340 of FIG. 3. As such, holes 345 of inner portion 340, bottom pins 325B, and upper pins 325A of FIG. 3 along with slots 620 of a lens cap outer ring may form another camming mechanism that forces a set of iris blades to open when the lens cap outer ring is rotated.

Figure 7:
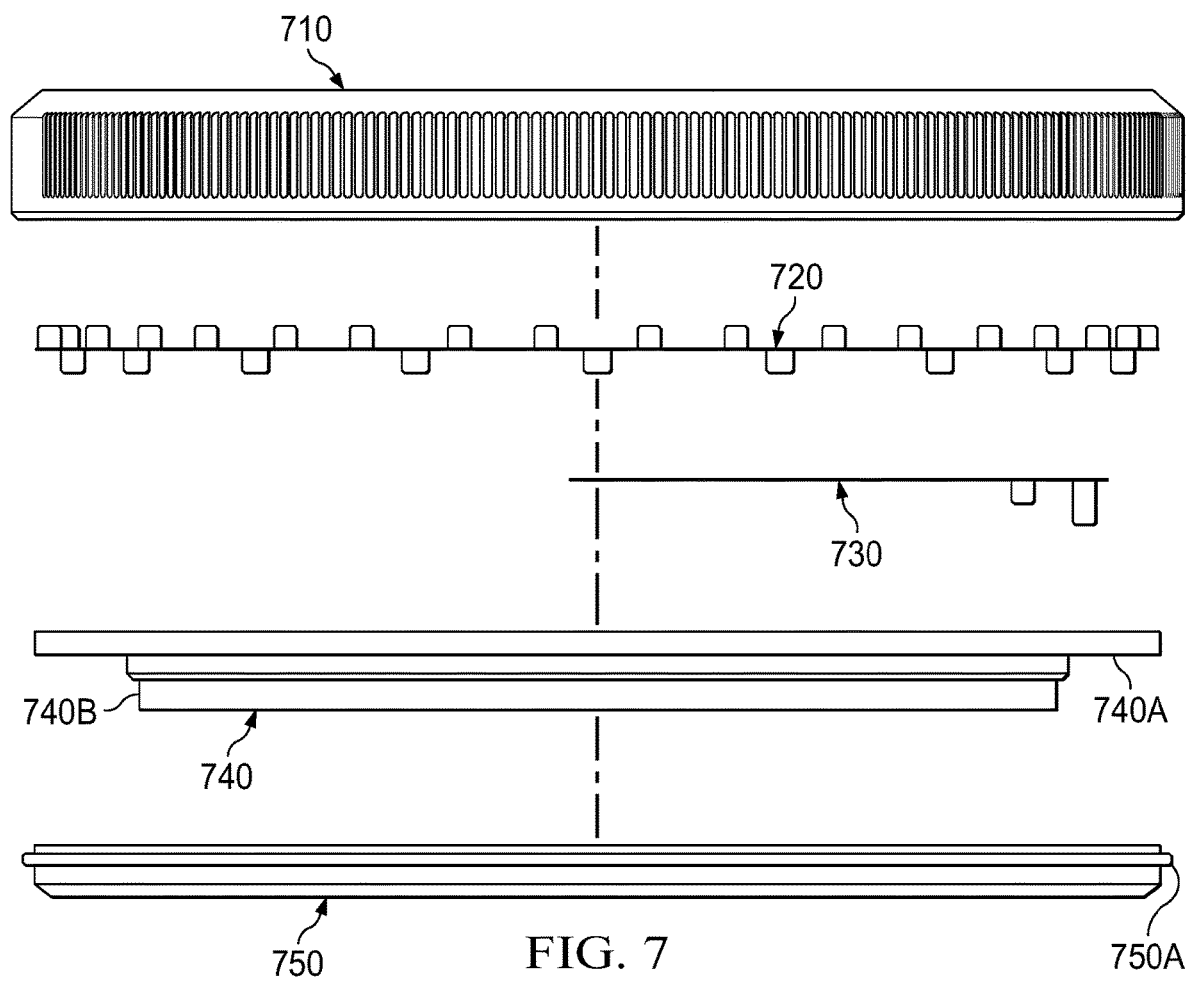
FIG. 7 illustrates a side view of various parts that may be included in a lens cap of the present disclosure.

FIG. 7 illustrates a side view of various parts that may be included in a lens cap of the present disclosure. FIG. 7 includes outer ring 710, iris 720, arm 730, inner ring 740, and spring 750. These parts may operate where rotation of the outer ring 710 results in the opening and closing of an iris as discussed above. FIG. 7 illustrates that an inner ring may have a shape that can receive a spring 750 such that an outer diameter of the spring 750 does not extend past an outer diameter of ring 740. Item 740A is an outer surface of ring 740 and item 740B is a surface of ring 740 that spring 750 may be attached to. An outer surface 750A of the spring 750 is shown in FIG. 7. When spring 750 is attached to ring 740, the outer surface 750A of spring 750 may not extend past outer surface 740A of ring 740. When spring 750 is attached to ring 740, outer surface 750A of spring 750 may align with outer surface 740A of ring 740, in such an instance spring 750 and ring 740 may have a same outer diameter.

Figure 8:
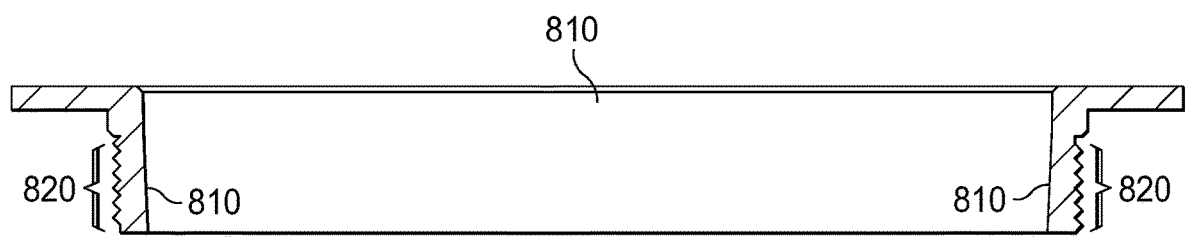
FIG. 8 illustrates a simplified cross-sectional view of a lens cap cover.

FIG. 8 illustrates a simplified cross-sectional view of a lens cap cover. The lens cap cover of FIG. 8 includes a cross-section of a portion of a lens cap cover 810 where (exterior) threads 820 are disposed along a surface of the lens cap cover. The threads 820 can be configured on an exterior surface of a cylindrical flange that extends from the lens cap cover 810. For clarity, FIG. 8 does not include all of the additional features discussed above. FIG. 8 is intended only to illustrate threads disposed on a surface that engage threads of a camera lens. While the threads 820 of a lens cap of the present disclosure may extend around an entire circumference of a surface of the lens cap, FIG. 8 does not illustrate this. As such, FIG. 8 illustrates a simplified lens cap that may have been cut more than once such that only features of the side walls and threads along a left and a right portion of those sidewalls are visible. The threads 820 could also be on the interior surface as well and can be configured depending on the structure of the corresponding complementary component. In other words, the lens cap of the present disclosure could be attached to other objects besides a camera lens.

Clips or other mechanisms can also be used to attach the lens cap cover to the camera lens as the use of threads 820 is exemplary. For example, some lens caps are a snap-on type of lens cover. Components such as engagement flanges, springs, and structures can be incorporated into the lens cap to enable a person to adjust or move the engagement flanges to attach the lens cap of the present disclosure to the camera lens.

Figure 9:
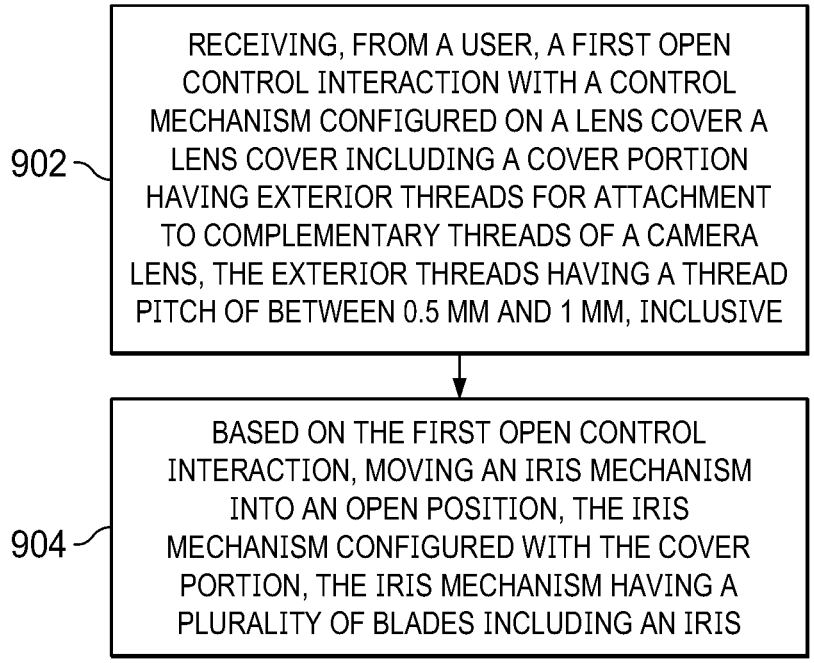
FIG. 9 illustrates a method embodiment of this disclosure.

FIG. 9 illustrates a method embodiment. The method can be practiced in connection with the lens cover structure disclosed herein. A method can include receiving, from a user, a first open control interaction with a control mechanism configured on a lens cover including a cover portion having exterior threads for attachment to complementary threads of a camera lens, the exterior threads having a thread pitch of between 0.5 mm and 1 mm, inclusive (902) and, based on the first open control interaction, moving an iris mechanism into an open position, the iris mechanism configured with the cover portion, the iris mechanism having a plurality of blades including an iris (904). The thread pitch may also be larger or smaller than the range provided above. The control mechanism can be configured to open the iris or to close the iris upon interaction of the control mechanism by the user. Thus, the method could also include receiving a closing control interaction by the user with the control mechanism. The closing control interaction can cause the iris mechanism to close and protect the camera lens. In an alternate embodiment, the lens cover may be attached via some other means besides threads and once attached, the method may include moving the iris mechanism having the plurality of blades.

Figure 10:
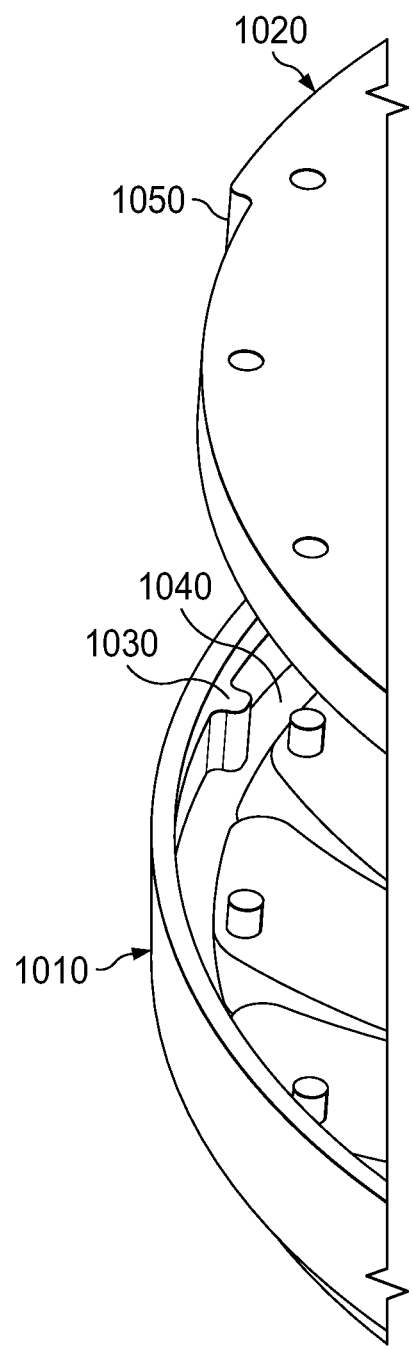
FIG. 10 illustrates an embodiment of a lens cap cover that includes mechanical features that limit how far a control mechanism can be rotated.

FIG. 10 illustrates an embodiment of a lens cap cover that includes mechanical features that limit how far a control mechanism can be rotated. FIG. 10 includes outer ring (control mechanism) 1010 that may be similar to outer rings 305, 510, 610, and 710 of FIGS. 3, 5, 6, and 7. FIG. 10 also includes item (inner ring) 1020 that may be similar to inner rings 340, 530, 640, and 740 of FIGS. 3, 5, 6, and 7. Outer ring 1010 includes stop 1030 and area 1040 and inner ring 1020 may include feature or flange 1050. Features 1030, 1040, and 1050 may have been made when parts of a lens cap cover where manufactured, for example, when outer ring 1010 and inner ring 1020 where injection molded. Alternatively, some or all of these features may have been made by machining parts. For example, area 1040 may be a recess or slot that was milled away from outer ring 1010. Stop 1030 may have also been made by one or more machining steps. Similarly, feature or flange 1050 may have been created by one or more machining steps. When assembled, feature 1050 may move in area 1040 as outer ring 1010 is rotated in a first direction. As soon as stop 1030 and feature 1050 touch, further motion of outer ring 1010 will be stopped (or impeded) because of feature 1050 engaging/hitting stop 1030.

While various diagrams provided and described above may show a particular arrangement of parts to perform certain embodiments of the invention, it should be understood that such arrangements are exemplary as alternative embodiments can perform operations consistent with the present disclosure (e.g. by swapping the use of pins and holes or pins and slots).

The foregoing detailed description of the technology herein has been presented for purposes of illustration and description. It is not intended to be exhaustive or to limit the technology to the precise form disclosed. Many modifications and variations are possible in light of the above teaching. For example, there may be other mechanisms for attaching the iris to a camera lens other than a threading for screwing the iris to the camera lens. Any mechanism used to attach a lens cover or a filter to a camera lens can be used to attach the iris cover to the camera lens. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A lens cover comprising:
   (a) a cover portion having exterior threads for attachment to complementary threads of a camera lens;
   (b) an iris mechanism configured at least in part in the cover portion, the iris mechanism having a plurality of blades comprising an iris;
   (c) a control mechanism such that a user can interact with the control mechanism to open the iris to use the camera lens or to close the iris to protect the camera lens;
   (d) a first set of coupling mechanisms coupled to the cover portion, wherein the cover portion is part of an inner circular portion that includes the first set of coupling mechanisms;
   (e) a plurality of couplers that attach the plurality of blades to the cover portion, wherein:
      (i) each the plurality of couplers are attached to at least one blade of the plurality of blades,
      (ii) the plurality of couplers mate with the first set of coupling mechanisms to attach the iris mechanism to the cover portion, and
      (iii) the iris mechanism includes a first set of features of a first camming mechanism that is coupled to the control mechanism;
   (f) a second set of features of the first camming mechanism, the second set of features coupling the iris mechanism to the control mechanism, wherein
      (i) rotation of the control mechanism forces relative motion between each respective blade of the plurality of blades based on the first camming mechanism, thereby generating a circular aperture of increasing size around a center portion of the camera lens, and
      (ii) the aperture increases in size until each of the plurality of blades retract to a critical circular size; and
   (g) an arm that includes a first part of a second camming mechanism that rotates the arm to a center position of the lens cover when the iris mechanism is in a closed position.

2. The lens cover of claim 1, wherein the plurality of couplers and the first set of coupling mechanisms mate based on a set of pins fitting into a set of holes.

3. The lens cover of claim 2, wherein the first set of features of the first camming mechanism couples to the second set of features of the first camming mechanism based on a series of pins fitting into a series of slots.

4. The lens cover of claim 1, wherein each of the plurality of blades are covered by part of the control mechanism when the iris mechanism is in an open position.

5. The lens cover of claim 1, wherein the second camming mechanism forces the arm against the iris mechanism when the iris mechanism is closed.

6. The lens cover of claim 1, further comprising a spring that couples to the cover portion.

7. The lens cover of claim 6, wherein the spring includes a slot that engages a pin of the arm and wherein the pin of the arm and the slot of the spring form a portion of the second camming mechanism.

8. The lens cover of claim 1, further comprising:
  an arm that includes a first part of a camming mechanism that rotates the arm to a position adjacent to a center position of the lens cover when the iris mechanism is in a closed position, wherein:
  a second portion of the camming mechanism is included in the cover portion and engages the first part of the camming mechanism, and
  the arm rotates based on relative motion of the first part of the camming mechanism and a second part of the camming mechanism.

9. The lens cover of claim 8, wherein the camming mechanism rotates the arm based on movement of a pin in a slot.

10. The lens cover of claim 9, wherein the cover portion includes a spring.

11. The lens cover of claim 10, wherein the spring includes a slot that engages a pin of the arm and wherein the pin of the arm and the slot of the spring form a portion of the camming mechanism.

* * * * *